United States Patent [19]

Frank

[11] 3,714,442

[45] Jan. 30, 1973

[54] EXPOSURE CONTROL CIRCUITRY

[75] Inventor: Lee F. Frank, Rochester, N.Y.

[73] Assignee: Eastman Kodak Company, Rochester, N.Y.

[22] Filed: June 4, 1971

[21] Appl. No.: 150,074

[52] U.S. Cl. ..............................250/209, 250/214 P

[51] Int. Cl. ..............................H01j 39/12

[58] Field of Search...250/219 F, 209, 220 M, 214 P; 95/10 C; 307/311

[56] References Cited

UNITED STATES PATENTS

| | | | |
|---|---|---|---|
| 3,563,143 | 2/1971 | Peterson | 250/209 |
| 3,545,350 | 12/1970 | Gross | 250/209 |
| 3,448,275 | 6/1969 | Hall | 307/311 |
| 3,448,274 | 6/1969 | Altman | 250/209 |
| 3,626,193 | 12/1971 | Ishihara | 307/311 |
| 3,525,868 | 8/1970 | Konig | 250/214 P |
| 3,413,065 | 11/1968 | Funk | 250/209 |

*Primary Examiner*—James W. Lawrence
*Assistant Examiner*—D. C. Nelms
*Attorney*—Robert W. Hampton, Paul R. Holmes and Lloyd F. Seebach

[57] ABSTRACT

A device for measuring the density of a radiation image in which an array of photoresponsive detectors is arranged relative to the image. Each detector is responsive to the radiation derived from a respective area of the image and generates an output signal in accordance therewith. Circuit means responsive to the output signal provides an electrical measurement corresponding to a density factor that is related to at least one of the image areas.

2 Claims, 7 Drawing Figures

LEE F. FRANK
INVENTOR.

BY Lloyd F. Dietsch

ATTORNEY

LEE F. FRANK
INVENTOR.

BY [signature]

ATTORNEY

LEE F. FRANK
INVENTOR.

BY [signature]

ATTORNEY

LEE F. FRANK
INVENTOR.
BY Lloyd F. Seebach
ATTORNEY

EXPOSURE CONTROL CIRCUITRY

FIELD OF THE INVENTION

This invention relates to an exposure control device and, more particularly, to circuitry associated with an array of diode logic photosensitive cells which measures and determines image contrast relative to both light intensity and time as a supplement to other exposure controls.

DESCRIPTION OF THE PRIOR ART

It is well known that circuitry including photosensitive or light-sensitive elements or cells can be used to determine the exposure in a printing process, or the color balance in a color printing method. However, this prior art circuitry is concerned with an actual and direct control of the requisite exposure by means of timing of the light source, actuating of one or more shutters, or positioning one or more filters in relation to an optical system, for a determined time. Also, exposure control circuitry, as disclosed by the prior art, is usually concerned with a measurement of the light transmitted through an image in the form of a transparency or reflected from an image in the form of a print arranged in a fixed plane. As a result, there is no actual scanning of the image in the fixed plane by a plurality of light-sensitive cells so as to generate an output signal or signals corresponding to the Dmax and Dmin of the image.

SUMMARY OF THE INVENTION

One object of this invention is to provide electrical circuitry for measuring electrically the density of an image so as to supplement another photographic exposure system.

Another object of this invention is to provide circuitry for a photographic exposure system which measures electrically the exposure required to reproduce an image having good rendition of highlights and shadows.

A further object of this invention is to provide a control circuit for monitoring a selected number of a plurality of photocell-resistor-diode components to obtain a maximum and/or minimum reading of the image density for use as a supplement for an exposure control device.

Still another object of the invention is to provide circuitry in the form of a plurality of photo-responsive elements that scan an image and generate signals related to the Dmax-Dmin of the image as an approximate exposure histogram.

The objects of the invention are attained by circuitry comprising a plurality of a serially connected, resistive elements and photosensitive detectors or light-sensitive cells (photocells) interconnected in parallel across a source of potential. A diode is connected between each serial circuit and a bus bar which, in turn, is interconnected to an operational amplifier. When the light-sensitive cells are positioned relative to the image, the resistance of each cell will vary, the one having the least illumination having the highest resistance and vice versa. Neglecting any current flow through the diodes, the voltage across the least illuminated light-sensitive cell is then the highest and the anode of that particular diode the most positive. If the impedance of an amplifier included in the circuitry is high in relation to the impedance of a single light-sensitive cell, then some current will flow through the diode and produce a voltage on a bus bar which reverses the bias on all of the other diodes. The voltage output from the amplifier can then be correlated to the light incident on the least illuminated light-sensitive cell in a repeatable and known manner. In certain applications of this circuitry, a lens can be placed in the front of the array of light-sensitive cells or in front of each such light-sensitive cell. In either case, a light or a dark area incident on any one light-sensitive cell does not act as a predominating control. The output from the amplifier is then used as a supplement for determining the exposure and can be a measure of the part of the overall image that would be preferred to be made predominant, for example, the background or the object per se.

DESCRIPTION OF THE DRAWINGS

Reference is now made to the accompanying drawings, in which like reference numerals and characters designate like parts and wherein.

DESCRIPTION OF THE PREFERRED EMBODIMENTS

Figure 1:
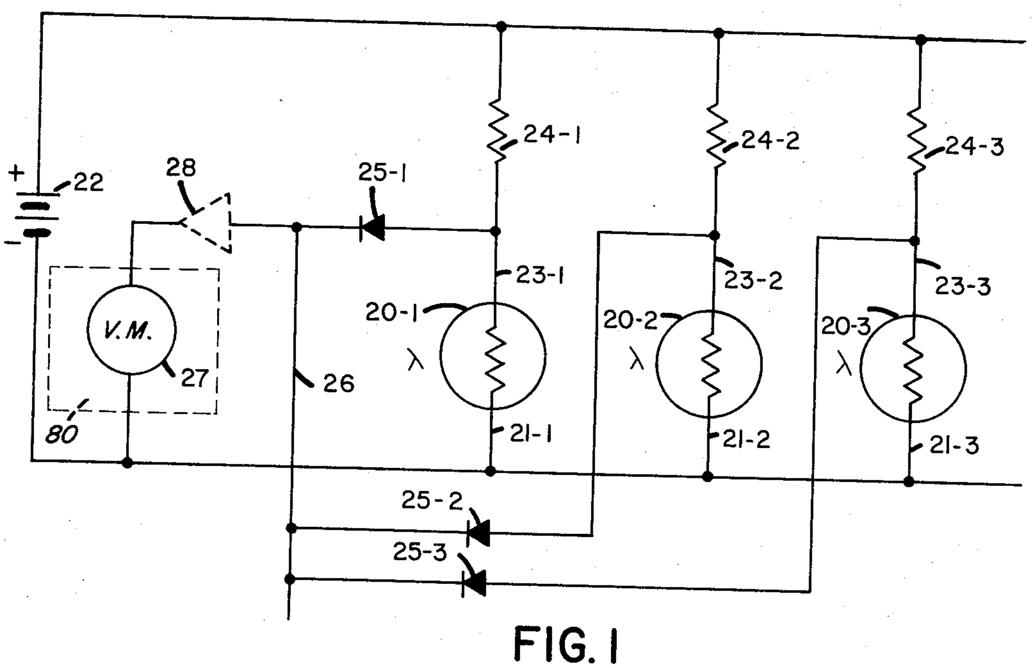
FIG. 1 is a schematic view of a circuit in accordance with the invention for determining the amount of illumination incident on the least-illuminated of a number of light-sensitive cells.

Referring now to FIG. 1, a circuit comprising only three components is shown, but any number of additional components, each of which is a discrete circuit comprising a photosensitive detector, a light-sensitive cell or a photocell, a resistor and a diode, can be added in parallel to give N total components without altering the function of the circuit. This circuit is used to derive exposure information relative to the least exposed photocell in a group of photocells. Such a group can comprise a large number of photocells because of the parallel circuitry arrangement. Each of a group of photocells (20-1, 20-2, 20-3, -20-N) is connected across a source of potential, such as a DC voltage supply 22. With respect to each photocell, line (21-1, 21-2, 21-3, -21-N) is connected to the negative terminal of DC voltage supply 22, and line (23-1, 23-2, 23-3, -23-N) is connected to the positive terminal of DC voltage supply 22 through a respective resistor (24-1, 24-2, 24-3, –24-N). A diode (25-1, 25-2, 25-3, –25-N) is connected from each of lines (23-1, 23-2, 23-3, –23-N) to bus bar 26, one end of which is connected to one terminal of voltmeter 27. The other terminal of voltmeter 27 is connected to the negative terminal of DC voltage supply 22.

If it is assumed that one of the photocells is receiving less illumination than any other, for example, photocell 20-1, then photocell 20-1 will have a higher resistance than any of the other photocells (20-2, 20-3, –20-N). Neglecting any current flow through diodes (25-1, 25-2, 25-3, –25-N), the voltage drop across photocell 20-1 will be greater than the voltage drop across any of the other photocells (20-2, 20-3, –20-N), and the anode of diode 25-1 will be more positive than the anodes of any of the other diodes (25-2, 25-3, –25-N). If it is assumed that the impedance of voltmeter 27 is higher than the impedance of the photocells (20-1, 20-2, 20-3, –20-N), then current will flow through diode 25-1 generating an output signal in the form of a voltage that is measured by voltmeter 27. The current flowing through diode 25-1 will also produce a voltage on bus bar 26 which will be essentially equal to the voltage drop across photocell 20-1. The voltage on bus bar 26 will reverse bias the other diodes (25-2, 25-3, –25-N). The requirement for successful operation of this circuit is that in most cases the sum of the currents flowing through the other diodes (25-2, 25-3, –25-N) and voltmeter 27 must be small compared to the current flowing through photocell 20-1. The voltage reading on voltmeter 27 is an electrical measurement corresponding to a density factor which can be correlated to the radiation transmitted or reflected by an image area. In this case, the voltage will indicate the least radiation or the least illumination incident on a photocell, namely, 20-1, the correlation being linear in log exposure over a large percentage of the range in many cases.

An amplifier 28 which has a high input impedance relative to the darkest photocell, can be placed in the circuit between bus bar 26 and voltmeter 27. A low impedance line can be used between amplifier 28 and voltmeter 27, therefore facilitating shielding. The use of a solid state amplifier in the circuit also allows the use of higher impedance photocells which, in general, tend to have shorter response times than those of lower impedance.

This circuit can be incorporated as an adjunct to an exposure control circuitry for subject error correction in color printing, for black and white printing, and for the printing of microfilm negatives. In any one of these cases, the output, which is shown in FIG. 1 as being connected to voltmeter 27, can be connected as an input to the exposure control circuitry to implement any of the aforementioned controls as a terminal adjustment thereof, whereby an optimum exposure can be produced. In the case of printing microfilm negatives, the larger percentage of the negative area inhibits transmission of the light and is, therefore, the least illuminated. However, the amount of light transmitted by the character areas is approximately equal to that inhibited so an exposure measurement is difficult to make with an averaging circuit. This exposure measurement would be based on the white areas in the final print and provide relatively little tolerance for exposure error. If the photocells are small compared with the size of the type in the negative image, the probability that only the non-character area will be measured by a circuit, such as that shown in FIG. 1, is about $n(1\ \ 1/10^n)$. Thus, a very few cells (10 more or less) will reduce the probability of error to a negligible degree.

Figure 2:
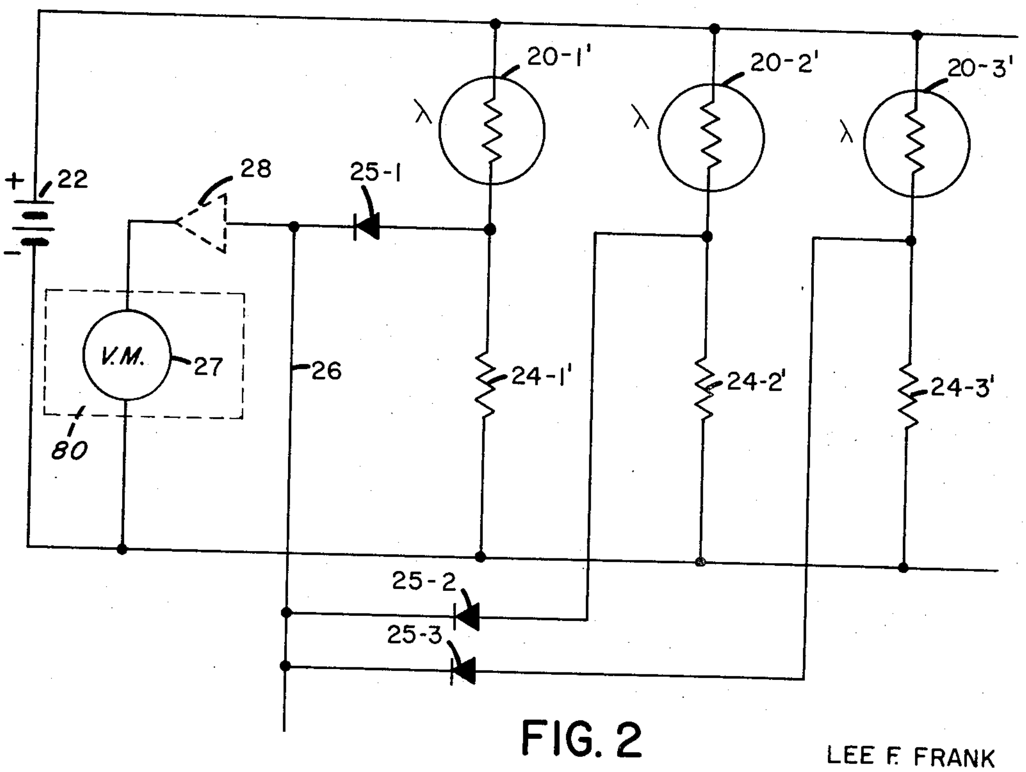
FIG. 2 is a schematic view of a circuit in accordance with the invention for determining the amount of illumination incident on the most-illuminated of a number of light-sensitive cells.

FIG. 2 shows a modification of the circuit shown in FIG. 1, in which the positions of the photocells and resistors in each discrete circuit have been interchanged. The circuit shown in FIG. 2 is used to determine the maximum amount of radiation falling on photocells (20-1′, 20-2′, 20-3′, –20-N′). Photocells (20-1′, 20-2′, 20-3′, –20-N′) are understood to be in the image plane of an optical system and to be receiving varying degrees of illumination, as described above with respect to FIG. 1. If it is assumed that one of the photocells is receiving more illumination than any other, for example, photocell 20-1′, then photocell 20-1′ has a lower resistance than any of the other photocells (20-2′, 20-3′, –20-N′). Neglecting any current flow through the diodes (25-1, 25-2, 25-3, –25-N), the voltage drop across photocell 20-1′ will be less than the voltage drop across any of the other photocells (20-2′, 20-3′, 20-N′), and the anode of diode 25-1 will be more positive than the anodes of any of the other diodes (25-2, 25-3, –25-N). If it is assumed that the impedance of voltmeter 27 is higher than the impedance of the photocells (20-1′, 20-2′, 20-3′, –20-N′), then current will flow through diode 25-1 generating an output signal in the form of a voltage that is measured by voltmeter 27. The current flowing through diode 25-1 will also produce a voltage on bus bar 26, said voltage producing a reverse bias on the other diodes (25-2, 25-3, –25-N). The requirement for successful operation of this circuit is generally the same as that discussed above with respect to FIG. 1 and will operate in the same general manner irrespective of which photocell is receiving the most illumination.

The circuit shown in FIG. 2 determines the brightest area and can be used in a printer to correct for some forms of subject failure, particularly in connection with the exposure for printing microfilm positives, since it is then measuring the part of the image that should, preferably, be a good white in the final rendition. Very often, the difference in voltage between that generated by the least and the most illuminated cells and/or the voltage generated by the least illuminated cell and the most illuminated cells are required. This need occurs when it is necessary to automatically control a printing process so as to produce a print having good image contrast.

From FIGS. 1 and 2, it is evident that such photocell and resistor comprises a discrete circuit connected across a source of potential. Also, each diode can limit the current flow, the current flow being through the diode associated with the detector on which the most or least illumination is incident. However, irrespective of the number of detectors, the voltage measured is only that generated by the controlling detector.

Figure 3:
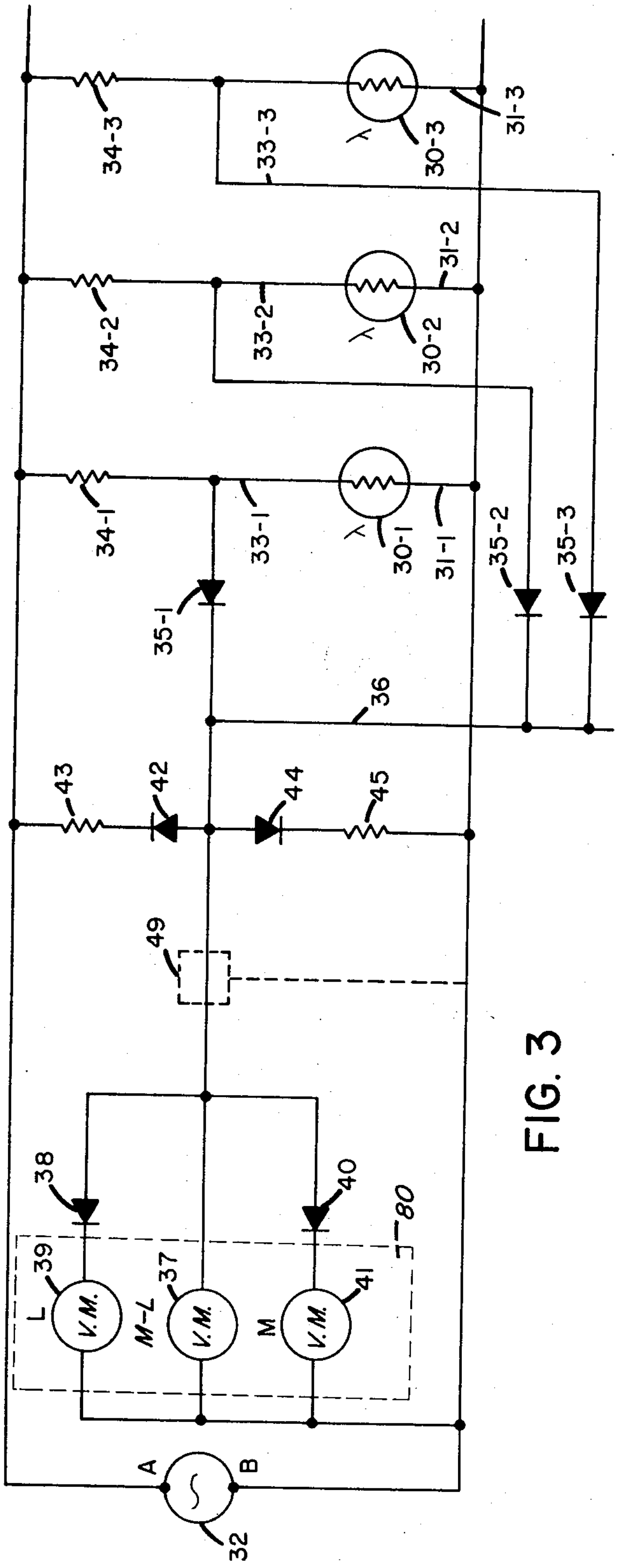
FIG. 3 is a schematic view of a circuit in accordance with the invention for determining the difference in illumination incident upon and most- and least-illuminated of a number of light-sensitive cells.

Referring now to FIG. 3, a circuit comprising only three components is again shown, but any number of additional components, each comprising a photocell, a resistor, and diode can be added in parallel to give N total components without altering the function of the circuit. A group of photocells (30-1, 30-2, 30-3, –30-

N) are connected across an AC voltage supply 32. In each photocell circuit, a line (31-1, 31-2, 31-3, -31-N) connects one side of its respective photocell to terminal B of AC voltage supply 32, and a line (33-1, 33-2, 33-3, -33-N) connects the other side to terminal A of AC voltage supply 32 through a resistor (34-1, 34-2, 34-3, -34-N). Each of the lines (33-1, 33-2, 33-3, -33-N) is also connected through a diode (35-1, 35-2, 35-3, -35-N) to a bus bar 36 which is connected via one end to one terminal of each of parallel-connected voltmeters 37, 39 and 41. The other terminals of the voltmeters are connected to terminal B of AC voltage supply 32. Connected in series circuit with each of voltmeters 39 and 41 is a diode 38 and 40, respectively. A diode 42 and resistor 43, are serially connected and in line with a serially connected diode 44 and resistor 45, the bus bar 36 being connected to a junction point between diodes 42 and 44.

The circuit shown in FIG. 3 is used to obtain a reading indicative of the amount of illumination falling on each of the most illuminated and the least illuminated photocell, and to also obtain a reading that can be related to the difference in illumination falling on each of the most illuminated and the least illuminated photocells. Photocells (30-1, 30-2, 30-3, -30-N) are understood to be in the image plane of an optical system and to be receiving varying degrees of illumination as described above with respect to FIG. 1. Let it be assumed that the AC voltage source 32 is in that half of its cycle during which terminal A will be positive and terminal B will be negative and that one of the photocells will be receiving less illumination than any other, for example, photocell 30-1. Then photocell 30-1 will have a higher resistance than any of the other photocells (30-2, 30-3, -30-N). Neglecting any current flow through diodes (35-1, 35-2, 35-3, -35-N), the voltage drop across photocell 30-1 will be greater than the voltage drop across any of the other photocells (30-2, 30-3, -30-N), and the anode of diode 35-1 will be more positive than the anodes of any of the other diodes (35-2, 35-3, -35-N). If it is assumed that the impedance of each of voltmeters 37, 39 and 41 is larger than that of any one of the photocells (30-1, 30-2, 30-3, -30-N), then current will flow through diode 35-1 and will produce a voltage on bus bar 36 that will be essentially equal to the voltage drop across photocell 30-1. The voltage on bus bar 36 will reverse bias the diodes (35-2, 35-3, -35-N) and diode 40. Diode 42 will be reverse biased by the positive voltage at terminal A of AC voltage supply 32. Current will flow through diode 38 generating an output signal that will be measured by voltmeter 39 and will be correlated to the illumination incident on the least illuminated photocell (30-1) in a repeatable and known manner. Current also flows through diode 44 and resistor 45 to terminal B of AC voltage supply 32. Obviously, the circuit will function in the same general manner if any one of the other photocells (30-2, 30-3, -30-N) receives the least illumination. Therefore, for each half cycle during which terminal A of AC voltage supply 32 is positive, voltmeter 39 provides a reading, or electrical measurement, that corresponds to a density factor related to the amount of illumination transmitted or reflected by an image area and incident on the photocell.

If it is now assumed that the AC voltage source 32 is in the half cycle during which terminal B is positive and terminal A is negative and one of the photocells is receiving more illumination than any other, for example, photocell 30-1, then 30-1 will have a lower resistance than any of the other photocells (30-2, 30-3, -30-N). Neglecting any current flow through diodes (35-1, 35-2, 35-3, -35-N), the voltage drop across photocell 30-1 will be less than the voltage drop across any of the other photocells (30-2, 30-3, -30-N), and the anode of diode 35-1 will be more positive than the anodes of any of the other diodes (35-2, 35-3, -35-N). Since the impedance of each of voltmeters 37, 39, and 41 is larger than that of any one of the photocells then current will flow through diode 35-1 and will produce a voltage on bus bar 36. The voltage on bus bar 36 will reverse bias diodes (35-2, 35-3, -35-N). Diodes 38 and 44 will also be reverse biased by the positive voltage at terminal B of AC voltage supply 32. Current will then flow through diode 40 generating an output signal that will be measured by voltmeter 41 and will be correlated to the illumination incident on the most illuminated photocell (30-1) in a repeatable and known manner. Current also flows through diode 42 and resistor 43 to terminal A of AC voltage supply 32. Therefore, for the half cycle for which terminal B of AC voltage supply 32 is positive and terminal A is negative, voltmeter 41 provides a reading, or electrical measurements, that corresponds to a density factor related to the amount of illumination transmitted or reflected by an image area and incident on the photocell.

Voltmeter 37 yields a reading indicative of the difference in illumination falling on the most and the least illuminated photocell. Voltmeter 37 does not provide an output or reading that is linear with respect to exposure or log exposure; hence, an impedance transformer, such as an amplifier 49, can be placed in series circuit with bus bar 36 and voltmeters 37, 39, and 41 so as to yield an output that is substantially linear.

Figure 4:
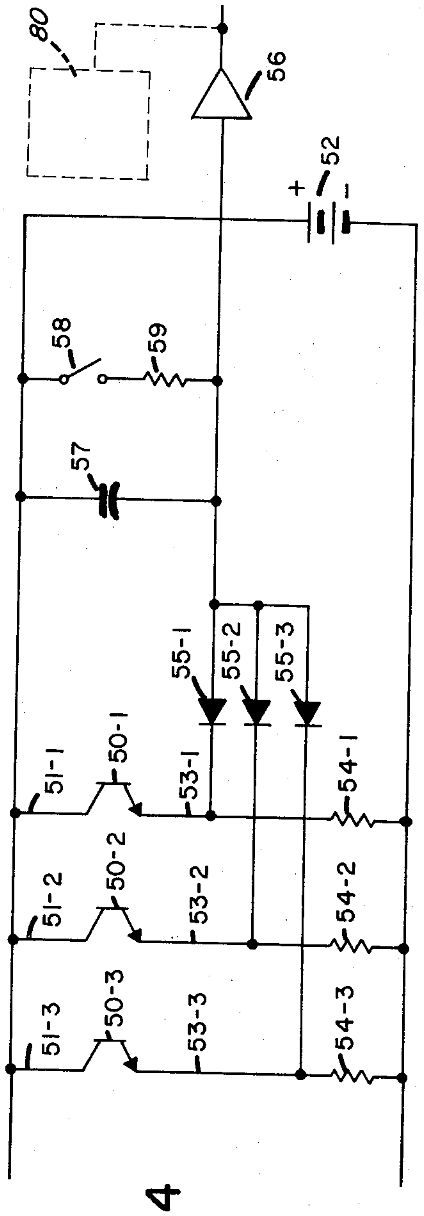
FIG. 4 is a schematic view of another embodiment of a circuit for determining the area of maximum density in a scanned image.

Referring now to FIG. 4, a circuit comprising only three components is again shown, but any number of additional components, each of which is a discrete circuit comprising a phototransistor, resistor, and diode, can be added in parallel to give N total elements without altering the function of the circuit. A group of phototransistors (50-1, 50-2, 50-3, -50-N) are connected across a DC voltage supply 52. In each phototransistor circuit, a line (51-1, 51-2, 51-3, -51-N) connects its respective collector to the positive terminal of the DC voltage supply 52 and a line (53-1, 53-2, 53-3, -53-N) connects its respective emitter through one of resistors (54-1, 54-2, 54-3, -54-N) to the negative terminal of DC voltage supply 52. Each of lines (53-1, 53-2, 53-3, -53-N) is connected through one of the diodes (55-1, 55-2, 55-3, -55-N) to an operational amplifier 56.

One side of a capacitor 57 is connected to the positive terminal of DC voltage supply 52 and the other side is connected through diodes (55-1, 55-2, 55-3, -55-N) and resistors (54-1, 54-2, 54-3, -54-N) to the negative terminal of DC voltage supply 52. A switch 58 and a resistor 59 are serially connected and then connected as a unit in parallel with capacitor 57 and to DC voltage supply 52.

The circuit shown in FIG. 4 can be used to determine the area of an image having the maximum density by scanning the image with a linear array of phototransistors arranged transverse to the relative movement of the image and the array. At any one moment, the least exposed phototransistor (50-1, 50-2, 50-3, -50-N) will charge capacitor 57. As the momentary maximum density of the image varies along the linear scanning line, the charge will be transferred from one to the other of the phototransistors so the least exposed of phototransistors (50-1, 50-2, 50-3, -50-N) will charge capacitor 57 to a value corresponding to the maximum density of the image. Capacitor 57 is initially uncharged, each terminal of capacitor 57 being at a potential equal to that of the positive terminal of DC voltage supply 52 when one of the phototransistors receives less illumination than any of the others, for example, phototransistor 50-1, then less current will flow through that phototransistor than the other phototransistors (50-2, 50-3, -50-N). The cathode of diode 55-1 is, therefore, less positive than the cathodes of any of the other diodes (55-2, 55-3, -55-N). As capacitor 57 is charged, the anodes of the diodes (55-1, 55-2, 55-3, -55-N) will become less positive. Since the cathode of diode 55-1 is less positive than the cathodes of any of the other diodes (55-2, 55-3, -55-N), diode 55-1 will conduct longer than any of the other diodes (55-2, 55-3, -55-N) and, hence, controls the charging of capacitor 57. The charge on capacitor 57 is in accordance with the voltage output from operational amplifier 56. The voltage output from operational amplifier 56 will, therefore, provide a control signal that can be correlated to the light falling on the least illuminated phototransistor, in this case and at the particular moment with respect to phototransistor 50-1. Obviously, the circuitry functions in the same manner irrespective of which of the other phototransistors (50-2, 50-3, -50-N) receives the least illumination. Hence, at any instant, the phototransistor receiving the least illumination controls the charging of capacitor 57 and the maximum charge will be placed on the capacitor by the phototransistor receiving the least illumination during the complete scan cycle. Capacitor 57, therefore, serves as means for storing the output signal of greatest amplitude. Switch 58 is closed to reset the charge on capacitor 57 to zero prior to the initiation of a new scan.

Figure 5:
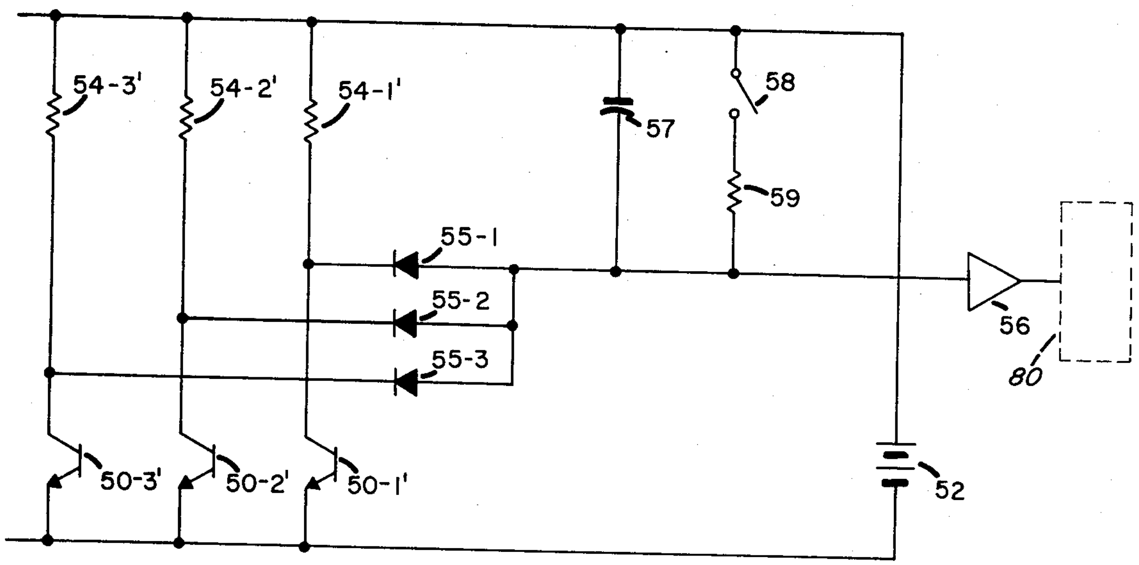
FIG. 5 is a schematic view of another embodiment of a circuit for determining the area of minimum density in a scanned image.

FIG. 5 shows a modification of the circuit shown in FIG. 4, in which the positions of the phototransistors and resistors have been interchanged. This circuit can be used to determine the area of minimum density in an image by scanning the image with a single line of phototransistors. At any one moment, the most exposed phototransistor (50-1', 50-2', 50-3', -50-N') charges capacitor 57. As the momentary minimum density of the image varies, the phototransistor (50-1', 50-2', 50-3', -50-N') which receives the most light (most exposed) will charge capacitor 57 to a value corresponding to the minimum density of the image. Capacitor 57 is initially uncharged, each terminal of capacitor 57 being at a potential equal to that of the positive terminal of DC voltage supply 52. If the phototransistor 50-1' receives more illumination than any of the others, more current will then flow through this phototransistor than through any of the others. The cathode of diode 55-1 will therefore be less positive than the cathodes of any of the other diodes. As capacitor 57 is charged, the anodes of the diodes (55-1, 55-2, 55-3, -55-N) become less positive. Since the cathode of diode 55-1 is less positive than the cathode of any of the other diodes, diode 55-1 will conduct longer and, hence, will control the charging of capacitor 57 at that particular moment in the scanning cycle. The charge on capacitor 57 will, therefore, correspond to the control signal or output derived from operational amplifier 56 and can be correlated to the light falling on the most illuminated phototransistor. Hence, at any instant, the phototransistor receiving the most illumination controls the charging of the condenser as in the circuitry of FIG. 4. Switch 58 is used to discharge the capacitor 57 to a zero charge prior to the scanning of another image.

Figure 6:
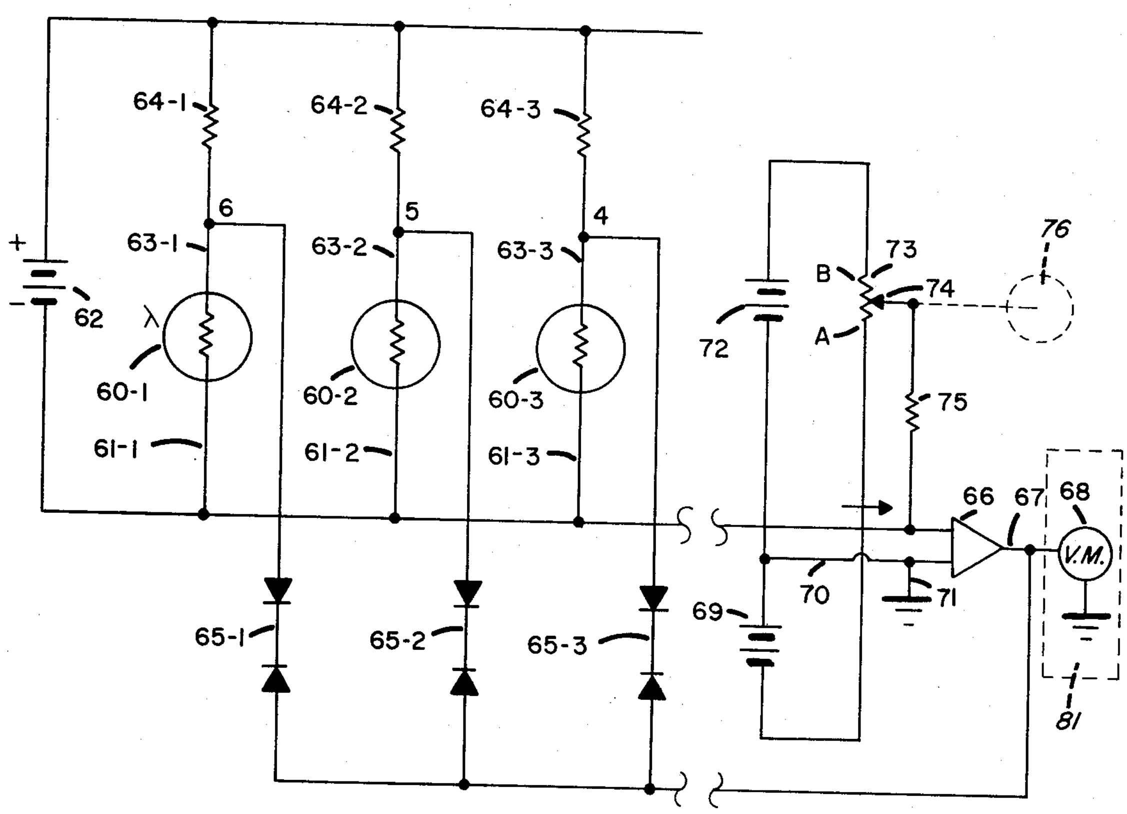
FIG. 6 is a schematic view of a circuit in accordance with the invention for providing an exposure histogram of an image.

Referring now to FIG. 6, a circuit comprising three components is shown, but any number of additional components, each comprising a photocell, resistor, and back-to-back set of diodes, can be added in parallel to five N total components without changing the function of the circuit. A group of photocells (60-1, 60-2, 60-3, -60-N) are connected across DC voltage supply 62. In each photocell circuit, a line (61-1, 61-2, 61-3, -61-N) connects its respective photocell to the negative terminal of DC voltage supply 62, and a line (63-1, 63-2, 63-3, -63-N) also connects the photocell to the positive terminal of DC voltage supply 62 through a respective resistor (64-1, 64-2, 64-3, -64-N). The lines (61-1, 61-2, 61-3, -61-N) are also connected to the inverting terminal of operational amplifier 66. The output line 67 from operational amplifier 66 is connected to the positive terminal of voltmeter 68 or to a recording device 81. The negative terminal of voltmeter 68 is connected to ground. Lines (63-1, 63-2, 63-3, -63-N) are also connected through a respective set of back-to-back diode (65-1, 65-2, 65-3, -65-N) to output line 67. The positive terminal of DC voltage supply 69 is connected by line 70 to the non-inverting terminal of operational amplifier 66. Line 70 is also connected to ground via line 71. The positive terminal of DC voltage supply 69 is also connected to the negative terminal of DC voltage supply 72 which has its positive terminal connected through a variably resistor 73 to the negative terminal of DC voltage supply 69. The center tap 74 of variable resistor 73 is connected through a resistor 75 to the inverting terminal of operational amplifier 66. The center tap 74 can be moved intermittently along resistor 73 in increments determined by a stepping motor 76 which can be connected in any suitably manner to center tap 74.

Figure 7:
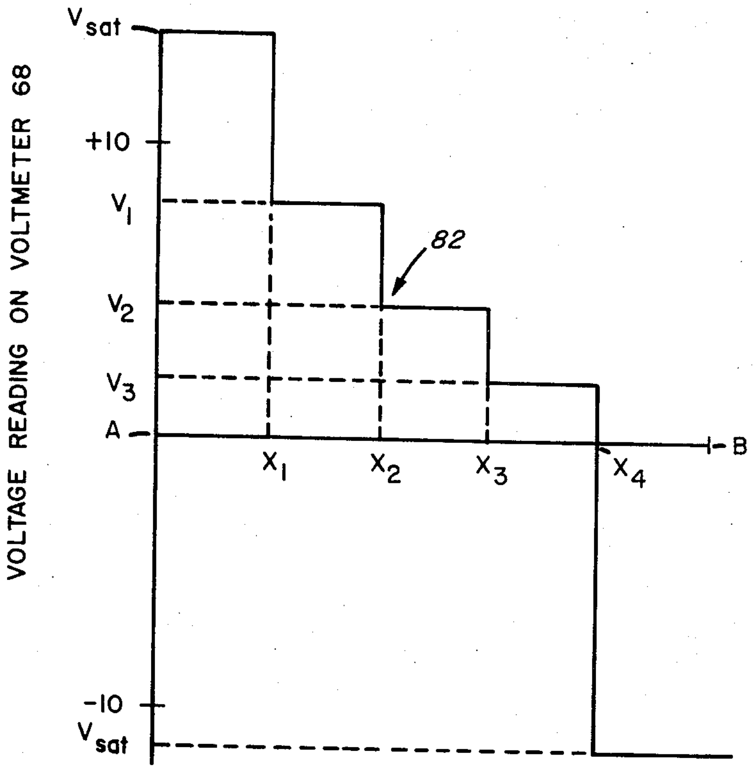
FIG. 7 is a graph showing voltage output plotted vs. the center tap position on a variable resistor.

The circuit shown in FIG. 6 can be used to provide an exposure histogram 82, see FIG. 7, of the radiation falling on photocells (60-1, 60-2, 60-3, -60-N). As described hereinabove, the photocells (60-1, 60-2, 60-3, -60-N) are arranged relative to the image or focal plane of an optical system so as to receive varying degrees of illumination. If it is assumed that photocell 60-1 is receiving less illumination than photocell 60-2, and that photocell 60-2 is receiving less radiation than photocell 60-3, the resistance of photocell 60-1 is higher than the resistance of photocell 60-2, and the resistance of photocell 60-2 is higher than the resistance of photocell 60-3. Therefore, the voltage appearing on line 63-1 of photocell 60-1 is higher than the voltage appearing on line 63-2 which, in turn, is higher than the voltage appearing on line 63-3. If center tap 74 is positioned at point A on variable resistor 73, the output of voltmeter 68 is shown in FIG. 7 as a function of the position of center 74 on variable resistor 73. When center tap 74 is in position A, the current flowing through resistor 75 to the inverting terminal of operational amplifier 66 produces a voltage on line 67 and, hence, the voltage reading on voltmeter 68 is equal to the saturation voltage, $V_{sat}$, of operational amplifier 66. Center tap 74 is then moved from point A toward point B. When center tap 74 reaches the point $X_1$ (see FIG. 7), the current flowing through resistor 75 to the inverting terminal of operational amplifier 66 produces a voltage on line 67 that is equal to the voltage $V_1$ (see FIG. 7), appearing on line 63-1 of the darkest photocell, 60-1. The set of back-to-back diodes 65-1 then become conducting, and a current flows through line 61-1 to the inverting terminal of operational amplifier 66 which produces a voltage output over line 67 to stabilize the voltage at the value $V_1$. As center tap 74 is moved along variable resistor 73 from point $X_1$ toward point B, a point $X_2$ (see FIG. 7) will be reached at which the current flowing through resistor 75 and line 61-1 to the inverting terminal of operational amplifier 66 will produce a voltage on line 67 that is equal to the voltage $V_2$ (see FIG. 7) appearing on line 63-2 of the second-most dark photocell 60-2. The set of back-to-back diodes 65-2 then becomes conducting, and a current flows through line 61-2 to the inverting terminal of operational amplifier 66 and causes the voltage output over line 67 to stabilize at the value $V_2$. As center tap 74 is moved still further along variable resistor 73 from point $X_2$ towards point B, a point $X_3$ (see FIG. 7) will be reached at which the current flowing through resistor 75 and lines 61-1 and 61-2 to the converting terminal of operational amplifier 66 will produce a voltage on line 67 that is equal to the voltage $V_3$ (see FIG. 7) appearing on line 63-3 of the third-most dark photocell, 60-3. In a like manner, the set of back-to-back diodes 65-3 then become conducting, and a current flows through line 61-3 to the inverting terminal of operational amplifier 66 and produces a voltage output over line 67 to stabilize at the value $V_3$. As center tap 74 is moved from point $X_3$ towards point B, a point $X_4$ (see FIG. 7) is reached at which the current flowing through resistor 75 and lines 61-1, 61-2, and 61-3 to the inverting terminal of operational amplifier 66 produces a voltage on line 67 and, hence, a voltage reading on voltmeter 68, equal to $-V_{sat}$ (see FIG. 7), equal to the negative saturation voltage of operational amplifier 66. The description presented hereinabove is based on the assumption that photocell 60-1 will be receiving the least illumination and photocell 60-3 the most illumination. Obviously, the circuit will function in the same manner irrespective of which of the photocells (60-1, 60-2, 60-3, -60-N) will be receiving the least illumination.

Using the circuit shown in FIG. 6, it can be seen that by noting the number of discontinuities in the output of voltmeter 68, as center tap 74 is moved along variable resistor 73, as described hereinabove, one can determine the amount of light falling on any photocell, for example, the third-most dark, and adjust the exposure accordingly.

The circuits described hereinabove can be used to determine the minimum and maximum amount of radiation falling on the photocells or transistors. In each embodiment, the photosensitive or light-sensitive elements are understood to be arranged relative to the focal plane of an optical system in which a photographic transparency or print transmits or reflects varying degrees of illumination. The transparency or print can be moved relative to a linear array of such elements or positioned relative to an areal array thereof. In either case, means must be provided to remember the element that receives the least or the most illumination. With a linear array, the illumination can continuously vary from one element to another as scanning takes place. In the case of an areal array, the illumination incident on each element remains the same but can vary from one to another.

In certain applications of the circuits described hereinabove, a lens can be positioned relative to each element or photocell, or to the complete array. In either case, the radiation or light meter formed by such a combination of lens and photocell will measure essentially only the shadow area in any scene toward which the meter is directed. If relatively few photocells are used to cover the field of view, it is believed that more consistent exposures can be obtained than with present exposure meters. For example, in a scene or picture in which a bright light source is in the field of view, an exposure meter based on the circuitry shown in FIG. 1 would ignore the light source (most-illuminated cell) and provide an exposure (based on least-illuminated cell) which would yield a printable negative. With respect to a movie camera, the exposure would be relatively independent of the amount of sky in the picture. If a photocell samples too small a field of view, there is a possibility of its providing for exposure of a small, dark detail in the shadows; therefore, there is an advantage in using a simple, small array of photocells.

Applications of the circuit described with respect to FIGS. 4 and 5 are the same as those discussed hereinabove with respect to FIGS. 1 and 2. In the case of FIGS. 4 and 5, however, capacitor 57 serves as a means for storing a voltage corresponding to the maximum image density which can be ascertained at the very beginning, at the very end, or at some intermediate point relative to scanning the complete image.

In each of the above embodiments of the invention, the voltage indicative of a most-illuminated or least-illuminated photosensitive element, light-sensitive element, transistor, etc. is used to augment an exposure control device or system, generally designated by the dotted line rectangle and by the numeral 80. With respect to FIGS. 1-3, the device 80 would replace the voltmeters 27, 37, 39, and 41, whereas in FIGS. 4 and 5, the output from amplifier 56 would be connected to the device 80. In FIG. 6, the voltmeter 68 would be replaced by a recording device 81 which would provide a histogram 82, such as that shown in FIG. 7. In any such application, the measured voltage as derived from the circuitry disclosed herein, would be used to supplement or adjust the exposure factor already independently generated by the device 80.

The invention has been described in detail with particular reference to preferred embodiments thereof, but it will be understood that variations and modifications can be effected within the spirit and scope of the invention.

I claim:

1. A device for measuring the density of a radiation image, comprising:

an array of photosensitive detectors arranged relative to said image, each detector being responsive to the radiation derived from a respective area of said image and generating an output signal in accordance therewith;

a source of potential;

first circuit means comprising a number of discrete circuits connected in parallel across said source of potential, each circuit including a resistor serially connected with one of said detectors;

second circuit means including an amplifier circuit having one input terminal serially connected to each of said first circuit means for producing a control signal corresponding to each of said output signals;

means serially connected with said amplifier circuit and one of said resistors and detectors of each discrete circuit and responsive to said control signal for limiting the current flow to only one detector and for inhibiting the flow of current from the other detectors in said array; and means connected between said one and another input terminal of said amplifier circuit for controlling said limiting means to render said detectors successively operative, whereby each of said control signals correspond to a respective image density factor.

2. A device in accordance with claim 1 including means responsive to said control signals for recording the density factor of each respective image area.

* * * * *